(No Model.)
E. A. STEARS.
CULINARY VESSEL.
No. 308,004. Patented Nov. 11, 1884.
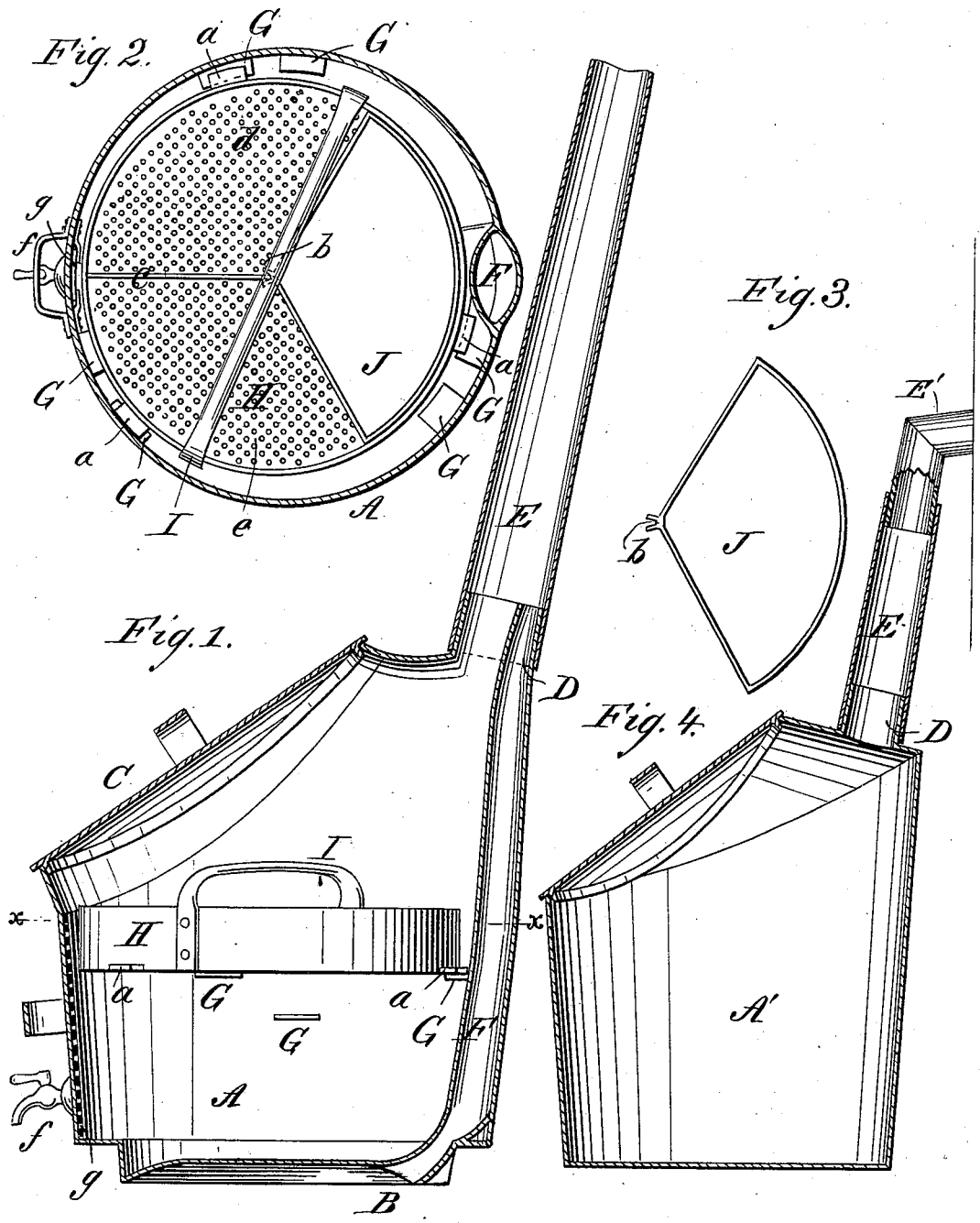
WITNESSES:
Donn Twitchell.
C. Sedgwick
INVENTOR:
E. A. Stears
BY Munn & Co
ATTORNEYS.

UNITED STATES PATENT OFFICE.

EMILY A. STEARS, OF BROOKLYN, NEW YORK.

CULINARY VESSEL.

SPECIFICATION forming part of Letters Patent No. 308,004, dated November 11, 1884.

Application filed September 22, 1883. (No model.)

*To all whom it may concern:*

Be it known that I, EMILY A. STEARS, of Brooklyn, in the county of Kings and State of New York, have invented a new and Improved Culinary Vessel, of which the following is a full, clear, and exact description.

My invention relates to vessels for cooking various kinds of food simultaneously.

Reference is to be had to the accompanying drawings, forming part of this specification, in which similar letters of reference indicate corresponding parts in all the figures.

Figure 1 in the drawings is a vertical section of my improved culinary vessel. Fig. 2 is a horizontal section taken on line $x$ $x$ in Fig. 1. Fig. 3 is a detail view of the sector-shaped vessel fitted to the tray, and Fig. 4 is a sectional view of a draining-vessel to be used in connection with the vessel shown in Fig. 1.

The vessel A has a pit, B, fitting the holes in the top of a stove or range. The top of the vessel is partly closed, and the open part is beveled upward and backward, and provided with a cover, C. A spout, D, is formed on the highest part of the vessel to receive a pipe, E, for conveying to the smoke-flue steam and vapors from the articles being cooked. This vessel is also provided with a flue, F, leading from the top of the spout D to the bottom of the pit B, so that by removing the pipe E and substituting for it a cap the steam and vapors may be discharged into the fire-space of the stove or range through the flue F. On the inner surface of the sides of the vessel there are three series of lugs, G, for supporting the tray H. Each series of lugs G is arranged spirally, and three ears, $a$, project from the sides of the tray H in position to rest on the lugs G, the height of the tray H depending on which series of lugs it is supported by. The tray H has a perforated bottom, and is provided with a handle, I, for convenience in handling. A sector-shaped pan, J, fitted to the tray H, has a grooved vertical rib, $b$, at its angle for receiving one end of a removable vertical partition, $c$, which extends from the pan J to the side of the tray H, dividing the portion of the tray not occupied by the pan into two sector-shaped compartments, $d$ $e$.

Into the pan J, as well as into the compartments $d$ $e$, may be placed different kinds of food to be steamed and cooked.

The pan J with its contents may be readily removed through the opening in the top of the vessel.

The vessel A is provided with a faucet, $f$, for drawing off the water or other liquid. A removable strainer, $g$, is placed over the inner opening of the faucet, to retain any solid particles suspended by the liquid in the vessel.

The vessel A', which is similar in form to the vessel A, and provided with a similar spout, D, and pipe E, for conveying away steam, is designed for receiving liquids from the vessel A and from other vessels used in cooking.

With the vessel herein described a great variety of cooking may be done without creating odors in the house, and a number of different dishes may be conveniently cooked at once.

It will be noted that the upward and backward incline of the top and cover C of the vessel serves to deflect the rising vapors directly into the pipe E at the highest point of the vessel, and facilitates the rapid escape of the vapors to the draft-flue. Into the upper end of the pipe E, fitting over spout D, projects a fixed pipe, E', whereby the pipe E is adapted to be slid up and down over either or both of the said spouts or fixed pipe, for accommodating the varying heights of the stove and draft-flue.

The tray H may be enlarged as to height at the inner side of the vessel where room is afforded, and a pan, J, correspondingly enlarged, may be employed, and the tray H may also have an imperforate or solid bottom, which in some instances will be preferred.

Having thus fully described my invention, I claim as new and desire to secure by Letters Patent—

1. The tray H, sector-shaped pan J, and partition $c$, in combination, as specified.

2. The tray H, having a perforated bottom, the pan J, and partition $c$, in combination, as herein specified.

EMILY A. STEARS.

Witnesses:
 HENRY L. GOODWIN,
 C. SEDGWICK.